(No Model.)  3 Sheets—Sheet 1.

C. H. FARNHAM.
GAGE FOR COUNTING TICKETS.

No. 491,800. Patented Feb. 14, 1893.

WITNESSES_
INVENTOR_
Chas. H. Farnham.
by
Wright, Brown & Crossley.
Attys.

(No Model.)  3 Sheets—Sheet 2.

C. H. FARNHAM.
GAGE FOR COUNTING TICKETS.

No. 491,800. Patented Feb. 14, 1893.

WITNESSES.
A. D. Harrison
C. E. Bartlett

INVENTOR.
Chas. H. Farnham
by
Knight, Brown & Crossley
Attys.

THE NORRIS PETERS CO., PHOTO-LITHO., WASHINGTON, D. C.

(No Model.) 3 Sheets—Sheet 3.

C. H. FARNHAM.
GAGE FOR COUNTING TICKETS.

No. 491,800. Patented Feb. 14, 1893.

WITNESSES.
A. D. Harrison.
C. G. Bartlett.

INVENTOR.
Chas. H. Farnham
by
Wright, Brown & Crosley
Attys.

UNITED STATES PATENT OFFICE.

CHARLES HAIGHT FARNHAM, OF BOSTON, MASSACHUSETTS, ASSIGNOR OF ONE-HALF TO ARTHUR W. CROSSLEY, OF SAME PLACE, AND CHARLES F. BROWN, OF READING, MASSACHUSETTS.

GAGE FOR COUNTING TICKETS.

SPECIFICATION forming part of Letters Patent No. 491,800, dated February 14, 1893.

Application filed May 24, 1890. Serial No. 353,015. (No model.)

*To all whom it may concern:*

Be it known that I, CHARLES HAIGHT FARNHAM, of Boston, in the county of Suffolk and State of Massachusetts, have invented certain new and useful Improvements in Apparatus for Counting Tickets or other Like Articles, of which the following is a specification.

This invention has for its object to enable the number of units or individual pieces in a pack or pile composed of said pieces to be readily determined by the thickness of said pack, and is intended principally for counting railroad and theater tickets, bank bills, and for other like purposes.

The invention consists as a whole in an apparatus embodying a bed to support a pack of tickets or other articles to be counted, a movable arm which is adapted to move toward and from the supporting face of said bed, a suitably inscribed dial marked with numbers or ordinals, a pointer or indicator adapted to move over said dial, and mechanism connecting said pointer with the said movable arm, the arrangement being such that the height or thickness of a package of tickets interposed between said bed and the movable arm will be indicated by the position of the pointer on the dial, said connecting mechanism being adjustable so that the apparatus can be used for tickets of different thickness.

My invention also consists in certain details and minor combinations of parts, all of which I will now proceed to describe and claim.

Figure 1:
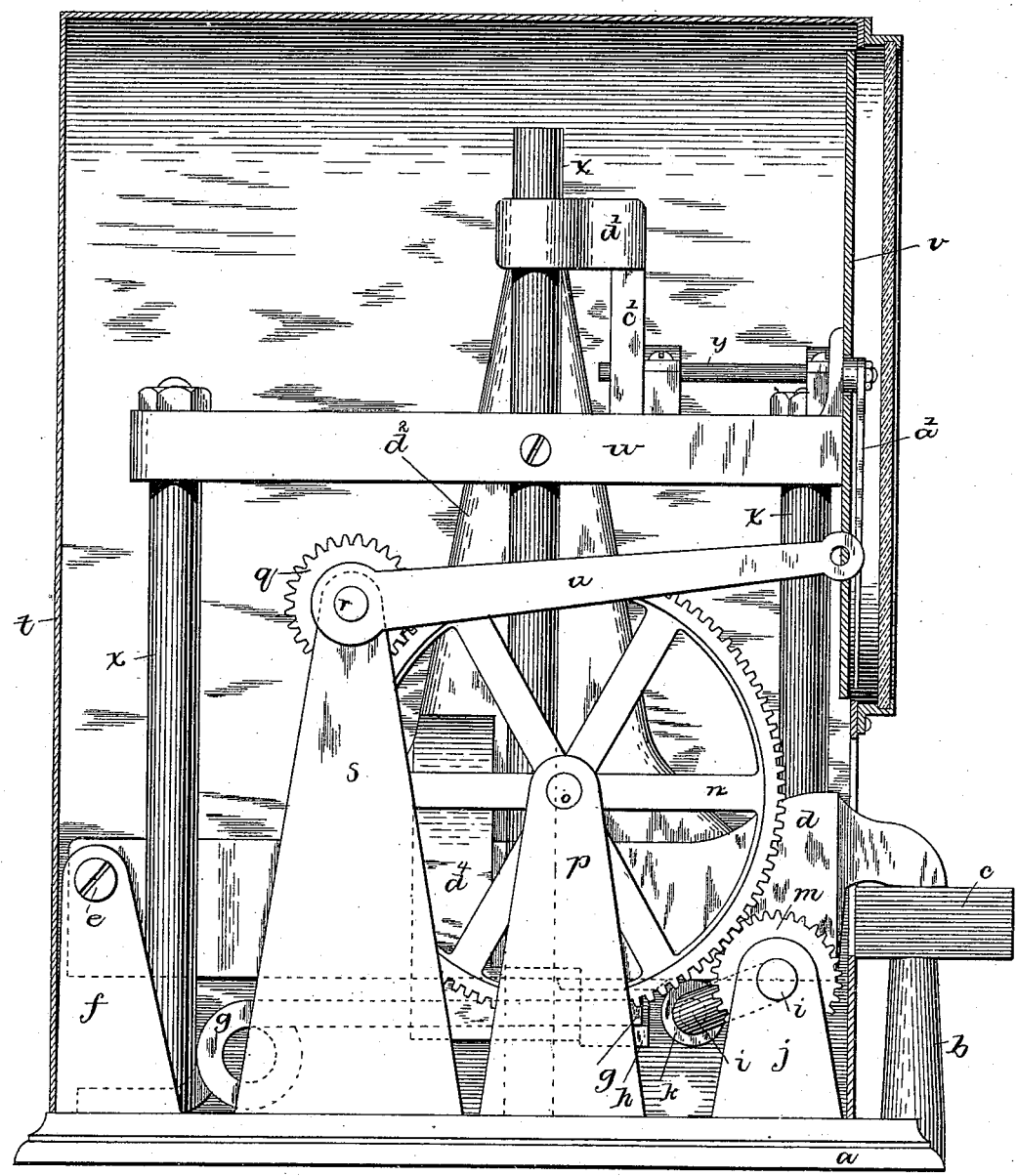
Figure 2:
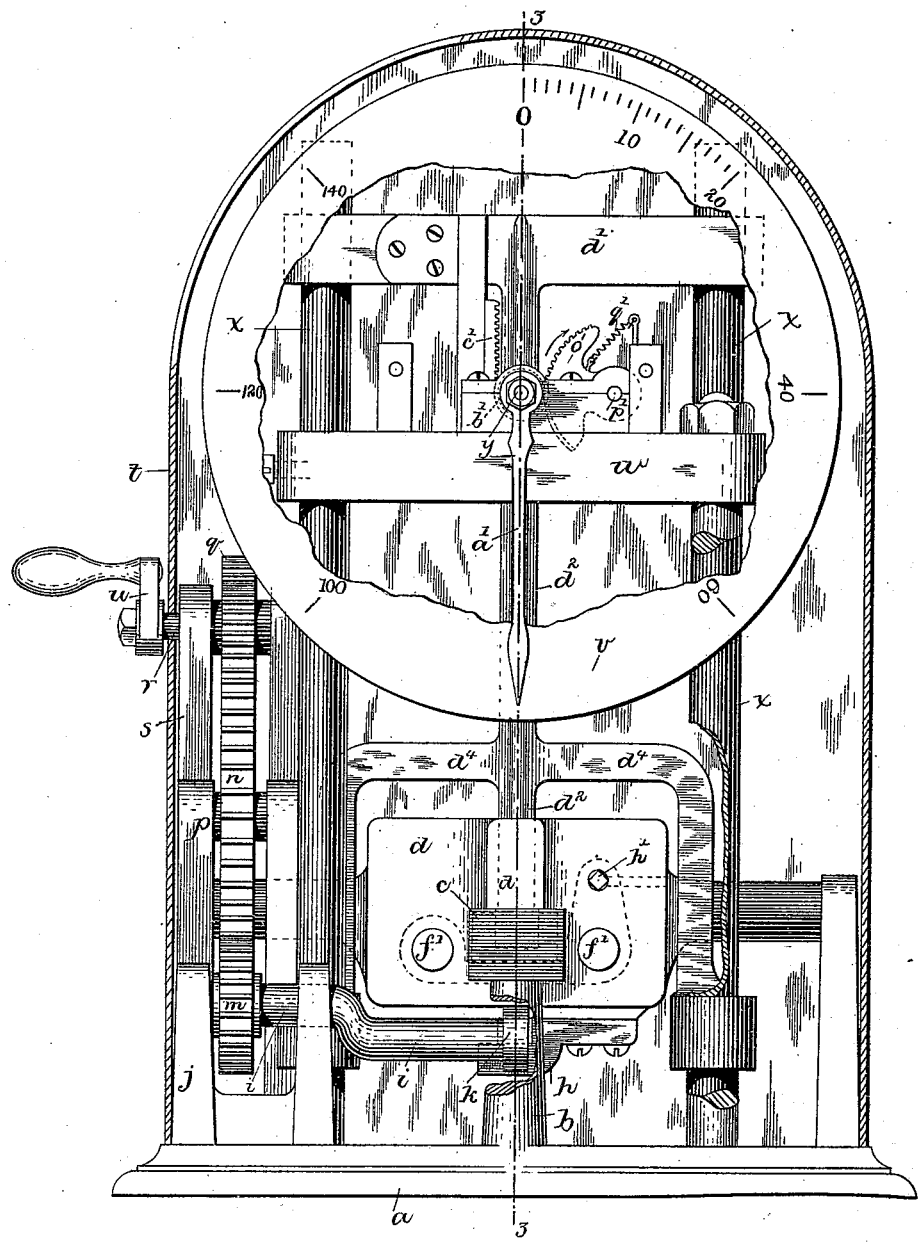
Figure 1A:
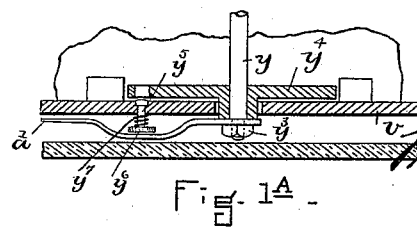
Figures 3, 4:
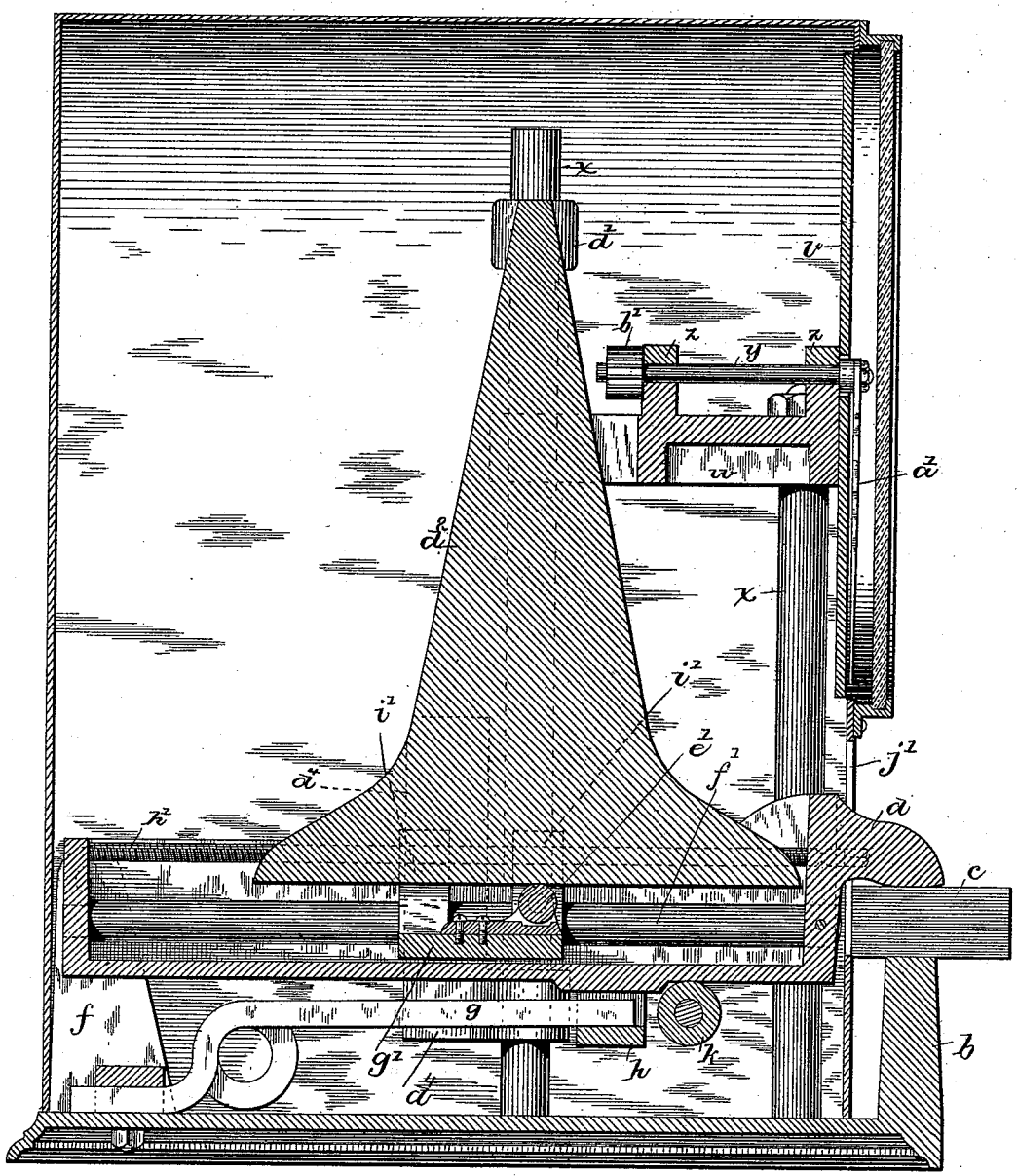

Of the accompanying drawings forming a part of this specification, Figure 1 represents a side elevation of an apparatus embodying my invention, the casing covering the same and the dial being shown in section. Fig. 1ª represents a vertical section of a portion of the apparatus including the dial, showing a modification which will be hereinafter described. Fig. 2 represents a front elevation, the casing being shown in section and portions of the dial and other parts being broken away. Fig. 3 represents a section on the plane of line 3 3 of Fig. 2. Fig. 4 represents a side view of a portion of the bed and a portion of the movable arm, showing the latter provided with a pivoted foot to bear upon the upper surface of the pack of tickets.

The same letters of reference indicate the same parts in all the figures.

In the drawings—$a$ represents a supporting base on which is mounted a standard $b$ the upper end of which constitutes the bed which supports the package $c$ of tickets or other articles to be counted.

$d$ represents a movable arm which is pivoted at one end at $e$ to ears or brackets $f$ affixed to the base $a$, its opposite end being located over the ticket supporting base or standard $b$ and movable toward and from the latter. I prefer to employ powerful spring pressure to press the swinging end of the arm $d$ downwardly toward the bed $b$, and to this end I provide a spring $g$ which is here shown as attached to the base $a$ and engaged at its free end with a socketed ear $h$ formed on the arm $d$ said spring having a tendency to force the arm downwardly.

To raise the arm $d$ against the pressure of the spring $g$ I provide a crank or crank-shaft $i$ which is journaled in a bearing $j$ on the base $a$, and extends under the arm $d$ near its swinging end, said crank being preferably provided with a trundle roll $k$ bearing against the under side of the arm $d$. Said crank is moved to raise the arm $d$ by means of a train of gearing comprising a pinion $m$ attached to the crank-shaft $i$, a gear $n$ meshing with said pinion and supported by a shaft $o$ journaled in a bearing $p$ on the base $a$, and another pinion $q$ attached to a shaft $r$ which is journaled in a fixed bearing $s$. The shaft $r$ extends outwardly from the casing $t$ that incloses the apparatus, as shown in Fig. 2, and has at its outer end a crank $u$ whereby the operator may set in motion the said train of gearing and thus raise the arm $d$ to the desired extent for the purpose of permitting the insertion of a package of tickets between said arm and the bed, and to permit the removal of said tickets after they have been measured or counted.

$v$ represents a dial which is supported by a frame composed of a top piece $w$ and vertical standards $x$, said standards being suitably attached to the base $a$ and extended upwardly therefrom. The top piece $w$ is provided with bearings $z\ z$ in which is journaled a shaft $y$ one end of which extends through the center of the dial and is provided outside of the dial with the pointer or hand $a'$ which is adapted by the rotation of the shaft $y$ to move over the dial. At the opposite end of the shaft $y$ is a pinion $b'$ which meshes with a vertical rack $c'$ attached to a crosshead $d'$. Said crosshead is adapted to slide on two of the vertical standards $x$, and has a downwardly extended shank or arm $d^2$. The lower end of said shank or arm bears upon an adjustable supporting roll $e'$ which is supported by the arm $d$, said arm being preferably hollow or trough-shaped, as shown in Fig. 3, and containing two longitudinal guide rods $f'$ on which is fitted a slide or carriage $g'$ supporting the roll $e'$, said carriage having ears in which are orifices that surround the guide rod $f'$. The slide or carriage $g'$ is adjustable lengthwise of the arm $d$ by means of a screw threaded shaft $h'$, the unthreaded ends of which are journaled in the ends of the arm $d$ while its threaded portion is engaged with internally-threaded sockets in ears $i'$ on the carriage $g'$. One end of the shaft $h'$ projects through a slot $j'$ in the front of the casing $t$ and is squared or made polygonal to be grasped by a wrench whereby it may be rotated to adjust the carriage $g'$ and thus move the supporting roll $e'$ toward or from the swinging end of the arm $d$.

It will be seen that when a pack of tickets is placed upon the bed $b$ and the arm $d$ is allowed to bear on the upper surface of the pack the height of said arm and the thickness of the pack will be indicated by the pointer $a'$, said pointer being caused to oscillate over the face of the dial by the upward and downward movements of the crosshead $d'$ and its shank $d^2$ through the rack $c'$ and pinion $b'$.

As the thickness of the tickets or pieces to be counted in the manner described is not always the same it becomes necessary to vary the movement imparted to the hand or pointer by a given movement of the arm $d$, and this is accomplished by the adjustment of the carriage $g'$ and the supporting roll $e'$ thereon. When it is desired to cause a given movement of the arm $d$ to cause the maximum movement of the pointer over the dial the carriage $g'$ is moved to the extreme of its adjustment toward the swinging end of the arm $d$, and when it is desired to cause the minimum movement of the pointer by a given movement of the arm $d$ the carriage $g'$ is adjusted as far as possible in the opposite direction. It is obvious that various intermediate adjustments of the movement of the pointer $a'$ with relation to the movement of the arm $d$ may be effected by adjusting the carriage $g'$ at intermediate points. It will be seen therefore that by counting a sample package of tickets before placing them on the bed $b$ and then adjusting the carriage $g'$ and support $e'$ while the arm $d$ is bearing on said sample package until the pointer $a'$ indicates the correct number on the dial the machine will be adjusted for the counting of tickets of the thickness of those in the sample, and will require no further adjustment until tickets of a different thickness are to be counted.

This apparatus, adjustable as described so that it can correctly count tickets or superposed pieces of different thicknesses, enables the tickets received in the offices of theaters, rail-roads, &c., or bills in banks, to be quickly and accurately counted.

I do not limit myself to the details of mechanism here shown and described, but may variously modify the same without departing from the spirit of my invention, it being my intention to cover in the following claims as broadly as possible within legal bounds any combination of devices whereby a given movement of an arm such as the arm $d$ toward and from a supporting bed may be caused to produce any desired movement of an indicator or pointer.

In Fig. 4 I have shown the arm $d$ as provided with a pivoted foot $d^3$ having a flat under surface which is adapted by the pivotal connection of the foot to the body of the arm to bear squarely upon the upper surface of the package of tickets. The extended flat bearing of the foot upon the package reduces the liability of inaccurate measurement by the sinking into the material of the package.

In Fig. 2 I have shown a rack segment $o'$ which is mounted to oscillate upon a center $p'$ and meshing with the pinion $b'$ at a point opposite the rack $c'$. Said segment is normally impelled in the direction indicated by the arrow by a spring $q'$, so that it holds the teeth of the pinion $b'$ with a yielding pressure against the teeth of the rack $c'$ thus preventing any lost motion of the pinion $b'$ and any wabbling of the hand $a'$ when the teeth of the pinion $b'$ and of the rack $c'$ become worn.

To prevent the lateral displacement of the lower end of the shank $d^2$ that communicates motion from the arm $d$ to the crosshead $d'$ and the rack $c'$ thereon I provide said shank $d^2$ with lateral downwardly-bent arms $d^4$, shown in Fig. 2, the lower ends of said arms being enlarged and provided with orifices which surround the standards $xx$ which guide the crosshead $d'$.

In Fig. 1$^a$ I have shown means for preventing the rotation of the shaft $y$ by rotary movement of the nut $y^3$ which confines the hand upon said shaft when said nut is being tightened to secure the hand to the shaft. If the operation of turning up the nut to secure the hand on the shaft be carelessly performed and the nut turned too hard the strain exerted on the shaft might injure the teeth of the pinion and rack if the shaft were free to be rotated with the nut. To prevent this possibility I affix to the shaft $y$ at a point within the dial a disk or plate $y^4$. Said disk is provided with one or more holes at a suitable point or points, said holes being arranged to engage the movable pin $y^5$ which is adapted to move in an orifice formed for it in the dial $v$. The pin is provided at its outer end with a suitable head $y^6$ and is normally pressed outwardly by a spiral or other spring $y^7$ so that it is normally out of engagement with the disk $y^4$. When the operator is turning up the nut $y^3$ to secure the hand to the shaft $y$, he engages the pin $y^5$ with one of the orifices in the disk $y^4$, and thus locks the shaft $y$ so that it cannot be rotated by the nut $y^3$. The disk $y^4$ will preferably have two pin receiving orifices, one arranged to receive the pin when the shaft $y$ is turned to the position it occupies when the arm $d$ is resting on the bed $b$, while the other is arranged to receive the pin when the arm is raised to its highest position.

I do not limit myself to the pin $y^5$ as the means for preventing the rotation of the shaft $y$ under the conditions above specified, but may hold the disk $y^4$ for the purpose of preventing the rotation of the shaft by any other suitable means, such as by teeth formed on the periphery of the disk and a suitable dog or pawl adapted to be moved into and out of engagement with said teeth, or by any other suitable clutch device.

I claim:

1. In an apparatus for counting tickets, &c., the combination of a supporting bed for a package of tickets to be counted, a pivoted arm having its free end movable toward and from said bed and adapted to bear on the upper surface of the package, a movable pointer or indicator, and adjustable connections between the said pointer or indicator and said movable arm whereby a given movement of the arm with relation to the bed may be caused to produce any desired movement of the pointer or indicator, as set forth.

2. In an apparatus for counting tickets, &c., the combination of a supporting bed, a pressing surface movable toward and from said bed, an indicator, and connections between said pressing surface and indicator, said connections including a lever and a movable surface located in the plane of movement of said lever and an interposed bearing adjustable along the length of the lever, for the purpose set forth.

3. In an apparatus for counting tickets, &c., the combination of a bed, an arm pivoted at one end to a fixed support and having its free end arranged over said bed, a pointer or indicator and connections between the same and the arm whereby movements of the arm are imparted to the indicator, said connections including a part adjustable along the length of the pivoted arm a spring whereby the arm is pressed toward the bed, and mechanism for moving the arm against the stress of said spring, as set forth.

4. In an apparatus for counting tickets, &c., the combination of a bed, of a pivoted arm the free end of which is movable toward and from the bed, a fixed dial, a rotary shaft at the center of said dial having a hand or pointer at one end and a pinion at the opposite end, and a vertically movable crosshead supported by the movable arm and provided with a rack meshing with said pinion, as set forth.

5. In an apparatus for counting tickets, &c., the combination of a bed, a pivoted arm the free end of which is movable toward and from the bed, a fixed dial, a rotary shaft at the center of said dial having a hand or pointer at one end and a pinion at the opposite end, and a vertically movable crosshead having a rack engaging said pinion, and a shank or standard extending downwardly from said crosshead, and an adjustable support on the movable arm for said shank or standard as set forth.

6. In an apparatus for counting tickets, &c., the combination of the ticket-supporting bed, the pivoted arm $d$ the free end of which is movable toward and from said bed, the sliding support mounted on guides on said arm, means for adjusting said support lengthwise of the arm, a vertically movable crosshead bearing on said support, a fixed dial, a hand or pointer movable over said dial, and connections between said hand or pointer and the cross head whereby the pointer is moved by movements of the crosshead, as set forth.

In testimony whereof I have signed my name to this specification, in the presence of two subscribing witnesses, this 17th day of May, A. D. 1890.

CHARLES HAIGHT FARNHAM.

Witnesses:
A. D. HARRISON,
ARTHUR W. CROSSLEY.